Patented Dec. 1, 1931

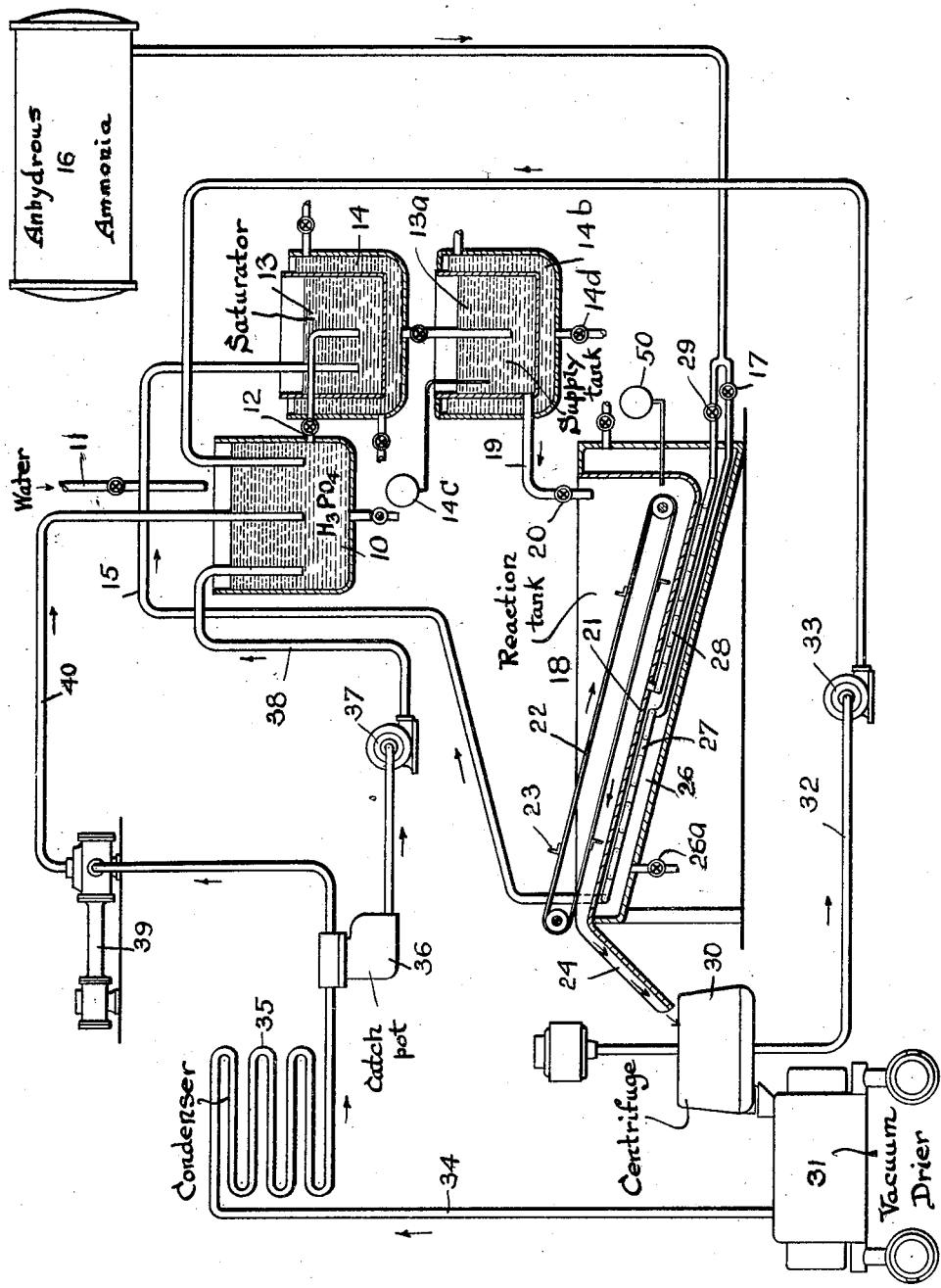

1,834,418

UNITED STATES PATENT OFFICE

ERNEST F. PEVERE, OF NIAGARA FALLS, NEW YORK, ASSIGNOR, BY MESNE ASSIGNMENTS, TO E. I. DU PONT DE NEMOURS & COMPANY, OF WILMINGTON, DELAWARE, A CORPORATION OF DELAWARE

PROCESS FOR MAKING DI-AMMONIUM PHOSPHATE

Application filed October 15, 1926. Serial No. 141,869.

This invention relates to improvements in processes and apparatus for making di-ammonium phosphate.

The invention has for one of its objects, the provision of a novel process and apparatus for making di-ammonium phosphate in such a manner that simplicity of control over the reactions may be secured so that the product can be made at a lower cost than heretofore.

A further object of the present invention resides in a process and apparatus for making the di-ammonium phosphate continuously. The di-ammonium phosphate secured by this process is in a comparatively pure state and free from mono-ammonium phosphate.

According to the present invention, provision is made for a re-acting upon a concentrated di-ammonium mother liquor with ammonia and substantially concentrated mono-ammonium phosphate. The di-ammonium mother liquor solution is preferably maintained at relatively low temperatures and the mono-ammonium phosphate which is added, is supplied at a relatively high temperature. In this way, ammonia losses are minimized and the di-salt crystals as they are produced, drop out of the mother liquor solution. Preferably, provision is made for continuously adding both the ammonia and mono-ammonium phosphate. Accordingly, the di-ammonium phosphate crystals are produced continuously and can be removed continuously as produced in the mother liquor. The quantity and concentration of the added mono-ammonium solution can be so controlled as to just replace the loss of the mother liquor. This loss of mother liquor is occasioned both by the loss due to the removal of the crystals and also by the loss of the mother liquor itself, which is carried out of the apparatus with the crystals as they are removed.

Provision is made for controlling the make-up solution of mono-ammonium phosphate in a simple manner which provides for a ready means for so controlling the reaction as to continuously produce a di-salt crystal at a fixed rate.

A still further object of the present invention resides in the process of continuously producing di-ammonium phosphate utilizing mono-ammonium solution in substantially saturated form at high temperatures and adding the same to a saturated dia-ammonium phosphate at relatively lower temperatures. Provision is made for a temperature control of both solutions to keep the same at the desired temperatures for properly carrying out the re-action. Such temperature control may be either upon the mother liquor solution or upon the mono-ammonium phosphate solution or preferably upon both solutions, and such temperature control provides a simple means for effecting the re-action in a proper manner so as to produce continuously di-ammonium phosphate in a comparatively pure state.

A further feature of the invention resides in the utilization of the cooling effect of the evaporation and expansion of ammonia used in the process for aiding in maintaining the desired low temperature of the mother liquor solution.

Further objects and advantages reside in the provision of a process and apparatus for making di-ammonium phosphate continuously, in which process, recoveries are made of all by-products which are returned to initial states of processes and again utilized by the processes.

Other objects and advantages will be hereinafter set forth in the accompanying specification and shown in the drawing, which by way of illustration shows in a diagrammatic manner what I now consider as a preferred embodiment of the apparatus used in carrying out the novel process.

In carrying out the process, assume that a quantity of saturated mother liquor of di-ammonium phosphate is in a re-action tank and that suitable means are provided for continuously removing therefrom di-salt crystals and for having ammonia and mono-ammonium phosphate solution fed thereto continuously.

For a proper re-action, it is preferable to keep the mother liquor solution at relative low temperatures, say from zero degrees to 40° C. Preferably the temperature range is from 10° to 30° C. The cooling of the mother liquor solution may be secured by a water jacket aided by the cooling effect of the expanding ammonia used in the process. For a given temperature of the mother liquor solution, the continuous addition of ammonia and substantially concentrated mono-ammonium phosphate will result in the continuous and uniform production of di-ammonium phosphate crystals at a pre-determined rate, provided the temperature and corresponding concentration of the added mono-ammonium phosphate is co-ordinated to the desired rate of crystal formation and to the amount of mother liquor which is removed with the crystals. Such co-ordination of temperature must also take into consideration, the temperature of the mother liquor solution itself. By properly co-ordinating such temperatures, the added ammonia and mono-ammonium phosphate can in this way keep a uniform concentration in the re-action tank itself, affording at all times a saturated solution of di-ammonium phosphate from which the crystals will drop out as produced. Once the production rate is established, it is only necessary to uniformly supply ammonia and mono-ammonium phosphate and co-ordinate its temperature and corresponding concentration to the temperature of the solution in the re-action tank.

The following table shows certain preferred temperatures and concentrations for the process both with an equal ratio of solid di-salt to the mother liquor which is removed with the crystals, and with varying ratios thereof.

| Temperature in re-action tank | Ratio of salt to mother liquor which is removed | Temperature of mono-solution supply tank | Concentration of mono-solution per cent by weight |
|---|---|---|---|
| 10° C | 50/50 | 108° | 66 |
| 20° C | 50/50 | 110° | 67 |
| 30° C | 50/50 | 112° | 68 |
| 20° C | 40/60 | 96° | 61 |
| 20° C | 50/50 | 110° | 67 |
| 20° C | 60/40 | 116° | 73 |

When the ratio of mother liquor to the di-salt liquors is once obtained, a simple control is afforded for the re-action for effecting a continuous and definite production of crystals.

In carrying out the process, the temperature of the re-action tank and the supply tank can be controlled by suitable jackets and furthermore, the cooling of the re-action tank can also be in part effected by the cooling effect of the expanding ammonia.

The preferred apparatus for carrying out the process will now be described.

In the drawing, 10 indicates a supply tank for phosphoric acid. A suitable water supply pipe with control valve may be provided as indicated at 11 and $P_2O_5$ can be added from time to time as required. From the tank 10, a pipe 12, provided with a suitable valve leads to a tank or saturator 13 provided with a suitable jacket 14. In this saturator, mono-ammonium phosphate is made by admitting ammonia gas to the phosphoric acid solution through a pipe 15. Pipe 15 derives its supply of ammonia gas from an anhydrous ammonia tank 16. In this supply line there is provided a suitable expansion and control valve designated at 17. From the saturator 13 in which the mono-ammonium phosphate solution is produced, the solution is admitted when the re-action is complete to a mono-ammonium supply tank 13a through a suitable valve pipe. In this tank 13a provision is made for controlling the temperature and corresponding concentration. Such control may preferably be secured by means of the valve 14d which controls the medium in the jacket 14b. To facilitate temperature control, a suitable thermometer 14c is provided. From tank 13a substantially concentrated mono-ammonium phosphate is admitted to the main re-action tank of the apparatus generally designated at 18 through a pipe 19 provided with a control valve 20. It will be understood that valve 20 can be used to control the rate of flow of the mono-ammonium solution to the re-action tank. The re-action tank 18 is provided with a sloping bottom 21 and over this bottom is arranged a traveling belt 22 provided with suitable scrapers 23 and driven in any convenient manner to scrape the di-salt crystals which have been formed in the re-action tank from the sloping bottom thereof and discharge them over an apron 24. Any convenient means may be provided for driving the traveling belt and it will be understood that the belt will remove the crystals continuously and remove with given amounts of crystals, a pre-determined amount of mother liquor which amount will be co-ordinated with the amount of crystals removed.

In order to control the temperature in the re-action tank a water jacket 26 may be provided. Within the jacket and preferably, but not necessarily, disposed below the sloping bottom 21, there are provided cooling coils 27 and 28 respectively. Cooling coil 27 is disposed in the ammonia supply line 15 and cooling coil 28 has an open end leading directly into the interior of the re-action tank to discharge ammonia gas thereinto. The flow of ammonia through this coil 28 into the re-action tank may be conveniently controlled by a suitable valve 29.

With the above arrangement the cooling effect of the evaporation and expansion of ammonia which takes place in coils 27 and 28, can be utilized for maintaining or aiding in maintaining the temperature of the solution in tank 18 at the desired low temperature limits. The temperature of the mother liquor solution may be shown by a suitable thermometer 50. The cooling effect of the ammonia can, if desired be supplemented or reduced by the use of proper amounts of cooling water in jackets 26. For controlling this cooling water, a valve 26a can be provided. It will be understood that the above apparatus provides for converting the mono-ammonium phosphate solution which is added to the re-action tank 18, into a di-ammonium solution or mother liquor and for maintaining a proper temperature control so as to cause di-ammonium phosphate crystals to fall out of the solution upon the sloping bottom 21 as the mono-solution is added. This re-action can furthermore be effected without the objectionable ammonia losses heretofore present when conversion was effected at relatively high temperatures. The crystals which are raked out of the re-action tank 18 by the traveling belt 22 pass from apron 24 into a centrifuge 30. From this centrifuge the relatively dry crystals are discharged into a steam jacketed vacuum dryer 31 and from time to time the dry crystals can be removed from this dryer. The mother liquor which is thrown out from the crystals by the centrifuge is entrapped and returned to the phosphoric acid tank by means of a pump 33 and return pipe 32. The water vapors and ammonia vapors which are driven off from the crystal dryer, pass through a pipe 34 and condenser 35 and through a trap 36. Condensate is returned to tank 10 by means of a pump disposed in pipe or conduit 38. The uncondensed relatively small amounts of ammonia are withdrawn by a vacuum pump 39 from the trap 36 and are returned to the main supply tank 10 by means of pipe 40. By the above apparatus, provision is made for expeditiously effecting the formation of di-ammonium phosphate dry crystals from phosphoric acid and of ammonia. Effective utilization is made of all waste produced in the process by the apparatus and in this way the cost of carrying out the re-action is materially minimized. All waste products are returned to the initial steps of the process.

It will be understood that the traveling carrier for the crystals removes these crystals as produced in the re-action tank and also that the carrier travels at a constant rate of speed. There is, accordingly, a constant rate of removal of the crystals and a corresponding constant rate of removal of the mother liquor from the re-action tank with the crystals.

What I claim is:

1. A process of producing di-ammonium phosphate, which comprises adding ammonia and a hot substantially concentrated solution of mono-ammonium phosphate to a concentrated solution of di-ammonium phosphate maintained at a relatively low temperature.

2. A process of producing di-ammonium phosphate, which comprises adding ammonia and a hot substantially concentrated solution of mono-ammonium phosphate continuously to a concentrated solution of di-ammonium phosphate and continuously removing the di-salt crystals at a rate co-ordinated to the rate of supply and concentration of the mono-ammonium phosphate solution and the rate of supply of the ammonia.

3. A method of producing di-ammonium phosphate, which comprises continuously withdrawing di-salt crystals from a concentrated di-ammonium phosphate mother liquor solution, adding continuously to said solution ammonia and substantially concentrated mono-ammonium phosphate solution, and co-ordinating the amount of mono-ammonium solution, and the temperature and concentration thereof, with the amount of di-salt mother liquor which is used and withdrawn in the process.

4. A method of producing di-ammonium phosphate, which comprises continuously withdrawing di-salt crystals from a concentrated di-ammonium mother liquor solution, adding continuously to said solution ammonia and substantially concentrated mono-ammonium phosphate solution, while maintaining a substantially fixed temperature in the di-salt solution and co-ordinating the amount of added mono-solution and ammonia to the amount of mother liquor which is used up.

5. The process of producing di-ammonium phosphate, which comprises forming di-ammonium phosphate crystals, by treating a concentrated solution of di-ammonium phosphate with ammonia and a solution of mono-ammonium phosphate, and thereafter drying the crystals and returning di-ammonium mother liquor removed from the crystals to an initial step of the process.

6. The process of producing di-ammonium phosphate which comprises adding ammonia gas and mono-ammonium phosphate to a concentrated solution of di-ammonium phosphate and in utilizing the cooling effect of the expansion of the ammonia gas for maintaining a low temperature in the di-ammonium phosphate solution.

7. The process of producing di-ammonium phosphate which comprises adding ammonia and a hot substantially concentrated solution of mono-ammonium phosphate to a concentrated solution of di-ammonium phosphate maintained at a temperature within the range of about 0° to 40° C.

In testimony whereof I hereto affix my signature.

ERNEST F. PEVERE.